United States Patent [19]

Squires

[11] 3,926,587
[45] Dec. 16, 1975

[54] ELECTROSTATIC FILTRATION IN PANEL BED

[76] Inventor: Arthur M. Squires, 245 W. 104 St., New York, N.Y. 10025

[22] Filed: Sept. 19, 1974

[21] Appl. No.: 507,387

[52] U.S. Cl. .............................. 55/12; 55/74; 55/98; 55/120; 55/131; 55/124; 55/302; 55/479; 55/517;
[51] Int. Cl.² ........................................ B03C 3/12
[58] Field of Search .............. 55/12, 14, 74, 79, 98, 55/99, 114, 120, 124, 131, 138, 154, 301, 302, 479, 518, 474, 517

[56] References Cited
UNITED STATES PATENTS

| | | | |
|---|---|---|---|
| 1,508,331 | 9/1924 | Huber | 55/124 |
| 3,296,775 | 1/1967 | Squires | 55/98 |
| 3,577,705 | 5/1971 | Sharlit | 55/120 |

FOREIGN PATENTS OR APPLICATIONS

| | | | |
|---|---|---|---|
| 43-7,114 | 3/1968 | Japan | 55/124 |

Primary Examiner—Bernard Nozick
Attorney, Agent, or Firm—Abraham A. Saffitz

[57] ABSTRACT

A panel bed fitted for puffback cleaning is provided that can filter dust from a gas over a granular material of unusually large particle size, with the advantage of lower pressure drop in the gas. For example, fly ash from combustion of pulverized coal can advantageously be filtered over a granular material about 10 to 14 mesh in size. The granular material is electrically conductive, and the panel bed is grounded electrically. A negative electrode is provided in the gas entry compartment serving the panel bed, so that dust particles are charged electrically and are attracted to the gas entry surfaces of the panel bed, where the dust forms a cohesive filter cake promoting high filtration efficiency.

16 Claims, 7 Drawing Figures

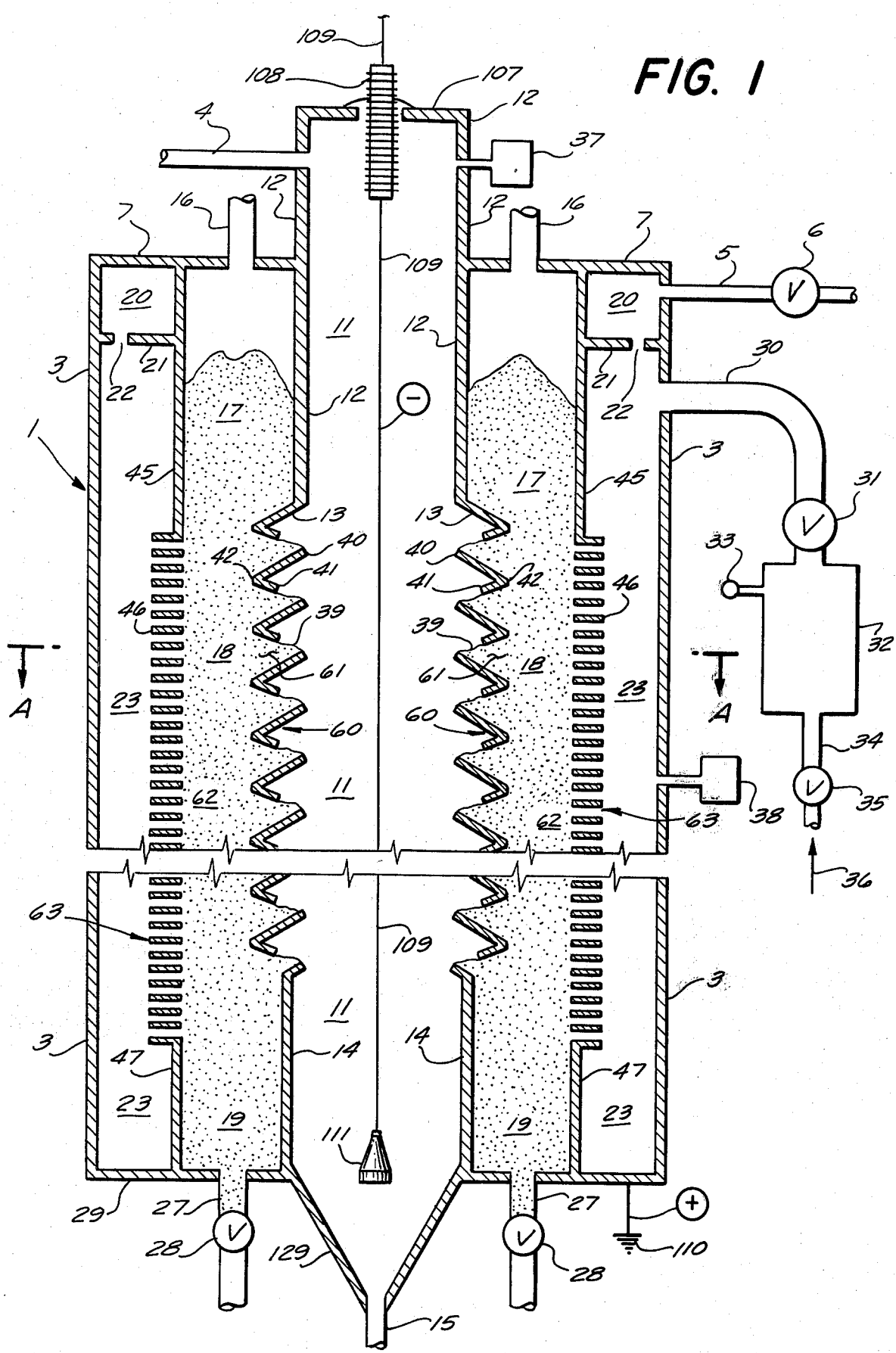

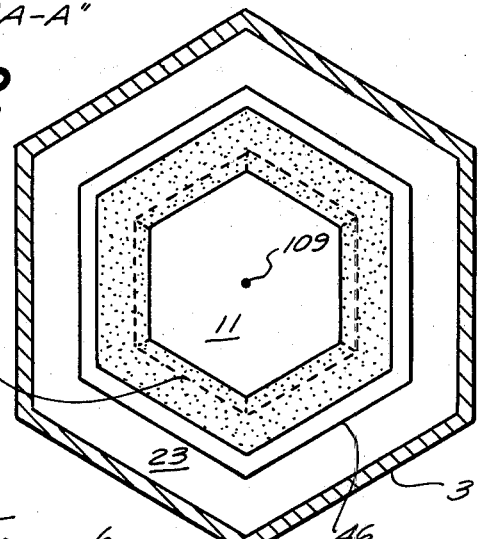
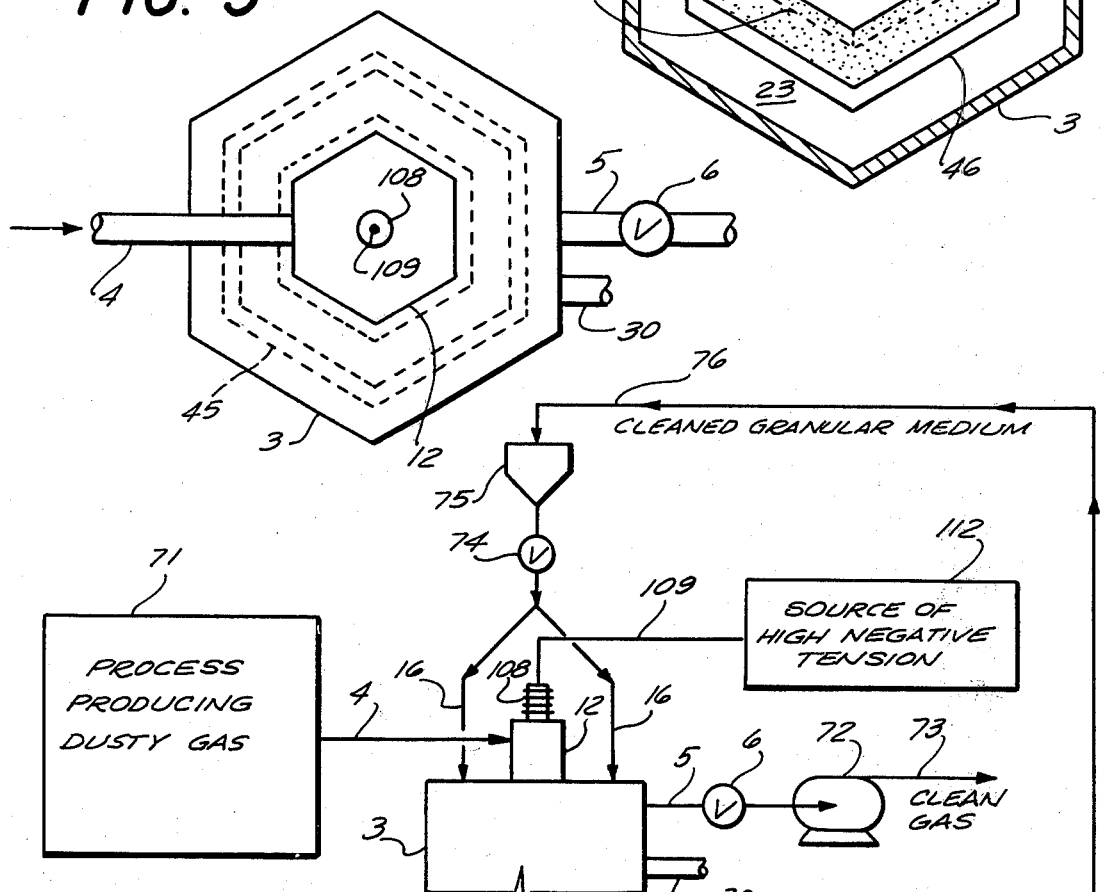
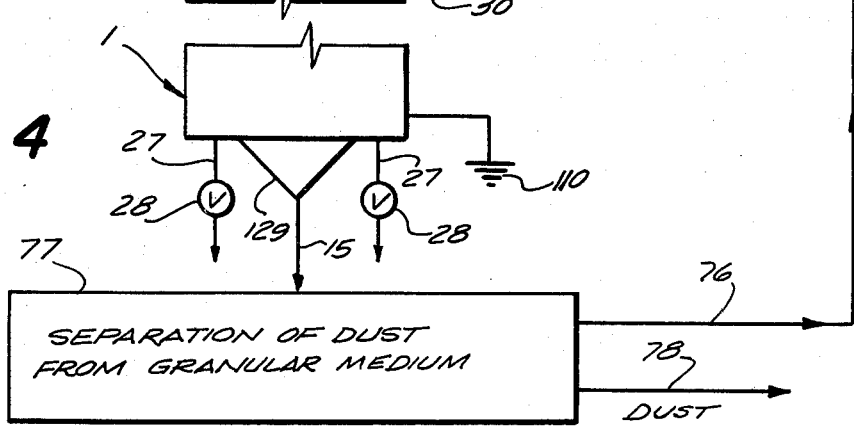

ELECTROSTATIC FILTRATION IN PANEL BED

CROSS-REFERENCE TO RELATED APPLICATIONS

This application is related to my co-pending applications, filed on Aug. 28, 1974, numbered and entitled as follows:
1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:

6. Precoating Panel Bed for Filtering Aerosol of Micron-Size Particulates, Ser. No. 507,403
7. Treating Gas with Chemically Reactive Dust in Panel Bed, Ser. No. 507,286
8. Treating Gas with Catalytic Dust in Panel Bed, Ser. No. 507,385
9. Solid-Gas Heat Exchange in Countercurrent Contacting of Gas and Granular Material in Panel Bed, Ser. No. 507,398
10. Treating Gas and Wetted Granular Material in Panel Bed, Ser. No. 507,377
11. Treating Liquid and Granular Material in Panel Bed, Ser. No. 507,376

The instant application is the fifth in this sequence.

FIELD OF THE INVENTION

The invention relates to the filtering of dust from a gas by a bed of granular material fitted for puffback cleaning. Specifically, filtration is improved by providing for electrostatic attraction between the filtered dust and the filtering medium.

In another of its aspects, the invention relates to the conditioning of air to remove odors by adsorption by an activated carbon while also removing micron-size particulates suspended in the air. The invention also relates to removal of suspended particulate matter and odors from industrial waste gases.

DESCRIPTION OF THE PRIOR ART

My aforementioned co-pending application number 1, "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas (i.e., puffback) to produce a movement of granular material in mass (a "body movement") toward the gas entry faces of a panel bed.

My aforementioned co-pending application number 2, "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

My aforementioned co-pending application number 3, "Countercurrent Contacting of Gas and Granular Material in Panel Bed", provides an improved gently curved louver that promotes countercurrenticity of contacting between gas and solid treated in a panel bed.

GENERAL DESCRIPTION OF THE INVENTION

In an experiment with a panel bed having chevron louvers (see FIG. 1A of my aforementioned co-pending application number 2 for a drawing substantially resembling the experimental arrangement), satisfactory filtration performance was obtained for removing redispersed fly ash from pulverized coal combustion at a face velocity (the horizontal velocity across the panel) of 11 feet per minute (ft/min) and using 10–14 mesh (U.S. Standard) quartz sand. The penetration of fly ash was 1.2 weight percent in the first filtration cycle, and in other cycles after successive puffback cleanings according to the specifications of my aforementioned co-pending applications number 1 through 4, the penetration was 0.6 percent in the second cycle, 0.4 percent in the third, and 0.3 percent in the fourth and fifth cycles. The operation had the great advantage of affording a low pressure drop in the gas being filtered, about 0.25 centimeters of water (cm) at the start of a filtration cycle, and about 0.7 cm at the conclusion of the cycle just before puffback cleaning. The spill of filter sand was acceptably small, weighing about 3.3 times as much as the collected fly ash.

The capacity of the panel bed in the experiment was poor, however, because of the relatively low face velocity. Although excellent filtration performance was obtained for the experimental arrangement using quartz sand smaller than 20 mesh at face velocities as high as 80 to 100 ft/min, numerous attempts to use 10–14 mesh sand at a face velocity of 30 ft/min, with puffback cleanings according to my new teachings of the aforementioned applications number 1 through 4, were without success in preventing a slow, steady increase in pressure drop across the panel bed with increasing number of filtration cycles, thus reflecting a deep penetration of fly ash within the filtering bed, unless puffbacks were applied that were so intense as to spill a weight of sand amounting to more than 50 times as much as the collected fly ash. This large sand spill is in contrast to spills between about 2 and 10 times as much as the fly ash collected upon sands smaller than about 20 mesh and larger than about 100 mesh, that are readily achieved by proper moderation of puffback intensity for such sands. The large sand spill experienced with 10–14 mesh sand would lead to an impractical requirement for equipment to clean the sand and recirculate the cleaned sand to the panel bed.

The explanation of the poor performance of 10–14 mesh sand in filtering redispersed power-station fly ash lay in my discovery that a filter cake of the fly ash did not form on the gas entry surfaces of the panel bed.

I have discovered that a cohesive filter cake of fly ash will form on the gas entry surfaces of a coarse filtration medium in a panel bed if it is arranged that there be an electrostatic attraction between the fly ash and the granular medium. The arrangement affords outstandingly good filtration efficiency at a low pressure drop for the gas being filtered and at high gas-treating capacity. At a face velocity of about 30 ft/min, a design treating 600 cubic feet per minute per square foot of ground plan occupied can be provided. This is about four times greater than the gas-treating capacity, in the same units, of a conventional electrostatic precipitator of the art for removing fly ash from a power-station stack at an efficiency of about 99 percent. The electrostatic filter of the instant invention will afford better dust collection efficiency at only a slightly higher pressure loss, about 3 to 4 cm. It will weigh far less, including the weight of the granular medium, and the mechanism to provide for puffback cleaning will be subject to far less wear and tear and need for maintenance and replacement of parts than the mechanism provided in the conventional precipitator for rapping dust collector plates.

OBJECTS OF THE INVENTION

An object of the invention is to provide an improved method and apparatus for the filtration of a gas containing particulate matter by a bed of a granular solid filtration medium.

Another object is to provide a panel bed for filtering a dusty gas in which filtration efficiency is improved by providing for electrostatic attraction between particles of dust to be filtered and granular material of the panel bed.

Another object is to provide a panel for filtering a dusty gas by a granular material of exceptionally large particle size affording low pressure drop in the gas.

Another object is to provide an improved panel bed filter of high gas-filtering capacity and low pressure drop.

Another object is to provide a filter for gas at elevated temperature.

Another object is to provide a panel bed for removing odor and micron-size particulates from polluted air, and yet another object is for removing odor and particulate matter from industrail waste gases.

SUMMARY OF THE METHOD FEATURES OF THE INVENTION

My invention relates to an improved method of filtering gas by granular material to remove particulate matter. Granular material is arranged in a bed having a plurality of transversely disposed, upwardly spaced, gas entry portions separated by interposed supporting members having outer and inner edges. The gas entry portions have gas entry faces that are substantially contiguous with these outer edges. The bed has gas exit portions spaced horizontally apart from the inner edges. A corona discharge of negative electricity is established in a space communicating with the gas entry faces, and gas containing particulate matter is caused to flow past the corona discharge and forwardly in a substantially continuing flow during its filtration through the gas entry portions of the granular material bed and outwardly from the gas exit portions to accumulate particulate matter on the gas entry faces. The supporting members are electrically conducting and are grounded, and the bed of granular material is electrically conducting. There is an electrical attraction between the particulate matter and the granular material, and cohesive deposits of particulate matter accumulate on the gas entry faces. Thereafter, a transient flow of gas is caused to move in the direction in reverse to the aforementioned flow of gas. The transient reverse flow produces first a rise (at a given rate of rise) and subsequently a fall in the pressure difference between the gas exit portions and the gas entry portions. This difference should remain greater than a first critical minimum difference for a time interval less than about 150 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to spill a portion of the granular material together with accumulated particulate matter from the bed. The second critical minimum difference depends upon the rate of rise in the pressure difference, being larger the more rapid the rise. The aforementioned time interval is sometimes advantageously held below about 50 milliseconds.

For convenience of reference, I use the term puffback for the specified reverse transient flow of gas and the term puffback cleaning to denote the operation whereby granular material is spilled from the gas entry portions of the panel bed to clean and renew the bed.

A typical support member of the panel bed advantageously has an upper and a lower surface each having outer and inner edges with respect to the filter bed. The upper and lower surfaces are articulated at an edge joint at their respective inner edges, the gas entry portions having gas entry faces that are substantially contiguous with the outer edges of the upper surfaces of the members. A line drawn through substantially each outer edge of a lower surface of a member and passing through the edge joint of the next subjacent member forms an angle of less than about 60° from the horizontal, an angle smaller than the angle of the failure plane, as determined from soil mechanics tests, for most granular materials that might preferably be employed in the panel bed filter.

In an application wherein the gas to be filtered is also advantageously contacted in a countercurrent manner with an active solid (such as in a treatment for removal of an odor by its adsorption by an electrically conducting activated carbon), a typical support member of the panel bed electrostatic filter is advantageously gently curved and inclines downwardly and inwardly from its outer edge and then upwardly and inwardly toward its inner edge. The inner edge of a typical supporting member is either above the inner edge of the gas entry face supported by the member, or, if below, a line drawn through these edges is inclined at an angle of less than about 45° to the horizontal. In conditioning air to remove both odor and suspended micron-size particulate dust, such as dust particles smaller than about 10 microns, the corona discharge is preferably positive in respect to the ground.

Sometimes it is advantageous to interrupt the corona discharge for the duration of the aforementioned reverse transient flow of gas.

SUMMARY OF THE APPARATUS FEATURES OF THE INVENTION

My invention also relates to an improved panel bed gas filter with a pair of upwardly extending, horizontally spaced-apart, perforate retaining walls. An electrical ground is in communication with the perforate walls. A gas inlet compartment is adjacent and in communication with the perforations of the first of the walls, and an elongated electrically conducting electrode element lies within the gas inlet compartment and is substantially coextensive therewith. A source of high electrical tension, biassed with respect to the ground, is in electrical communication with the electrode element. A gas outlet compartment is in communication with the perforations of the second of the perforate walls. There are means for supplying a loose electrically conducting solid particulate material into the space between the perforate walls. There is a plurality of particulate-material support members each adjacent a perforation of the first perforate wall. The members cooperate to support and expose to the inlet compartment a plurality of free surfaces of the particulate material and to retain the material in the aforementioned space. There is an inlet for admitting gas containing particulate matter into the inlet compartment, and an outlet for removing gas from the outlet compartment. Means are provided for periodically effecting a body movement of the particulate material toward the inlet compartment of at least those portions of the particulate material including the free surfaces and which are retained on the supporting members as well as cohesive deposits of the particulate matter formed at the free surfaces. The body movement means comprises means for effecting a transient flow of gas from gas outlet compartment to gas inlet compartment that produces first a rise and subsequently a fall in the pressure difference between the gas outlet compartment and the gas inlet compartment, the pressure difference remaining greater than the aforementioned first critical minimum difference for less than about 150 milliseconds and preferably for less than about 50 milliseconds. The pressure difference also should peak to a top value beyond the aforementioned second critical minimum difference.

The perforate retaining walls are advantageously hexagonal when viewed in plan, and the aforementioned gas inlet compartment is preferably a space within the aforementioned first perforate wall and surrounded by this wall. The gas outlet compartment is outside the second perforate wall. In this arrangement, the electrode elelment is advantageously a wire hanging vertically at substantially the center of the gas inlet compartment.

BRIEF DESCRIPTION OF THE DRAWINGS

FIG. 1 is a vertical section view of a preferred electrostatic filter panel, with a bed of granular material.

FIG. 2 is a cross-sectional view in plan at a plane A—A designated in FIG. 1.

FIG. 3 is a top view of the panel of FIG. 1.

FIG. 4 is a schematic diagram illustrating use of the invention to filter a dusty gas and exhibiting a source of high negative electrical tension.

DESCRIPTION OF THE PREFERRED EMBODIMENTS

Figure 5:
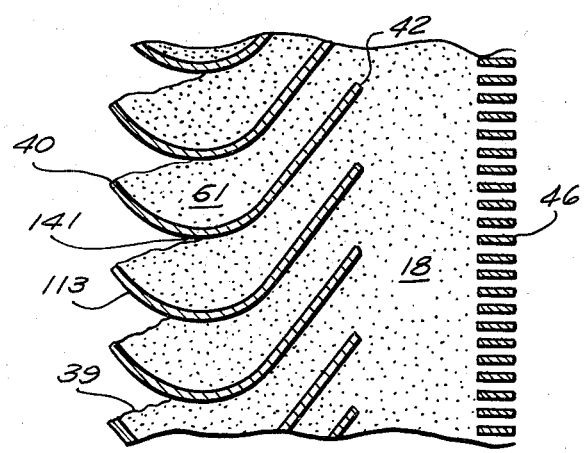
FIGS. 5, 6, and 7 show alternative support members for the panel bed's entry face.

In the several figures, like reference numerals refer to like parts having like functions. In FIG. 1 the electrostatic panel bed filter 1 comprises a casing of hexagonal cross-section having an outside wall 3 and top plate 7 and bottom plate 29. A generally vertical bed of electrically conducting granular filter material, such as carbon or carborundum or a metal powder, is at 18 within the casing and is retained by vertically extending, horizontally spaced-apart, perforate walls 60 and 63. Each perforate wall is hexagonal in plan, as seen in the cross-sectional plan view in FIG. 2. The granular material is supplied by gravity feed to bed 18 from supply bed 17, occupying the space between hexagonal walls 12 and 45 (seen also in a plan view in FIG. 3). Additional granular material may be added to bed 17 from several pipes 16. Granular bed 18 may be drained, if desired, via space 19 between hexagonal walls 14 and 47, normally filled with static granular material, by means of several pipes 27 each fitted with a valve 28. Perforate wall 63 comprises a series of generally horizontal louvers or slats 46 mounted above another in a structure resembling subway grating and narrowly spaced apart in the vertical direction, the spacing between adjacent louvers 46 being comparable to the dimensions of the average particle of the granular filter material. Walls 12, 60, 14, conical bottom 129 in an opening in bottom plate 29, and top plate 107 terminating an extension of wall 12 through an opening in top plate 7 enclose gas entry compartment 11, to which gas to be filtered is supplied from pipe 4. Walls 45, 63, 47, and 3, bottom plate 29 and partition 21 enclose gas outlet compartment 23, from which gas leaves via slot 22 in partition 21, the slot 22 preferably extending substantially completely around the circumferance of hexagonal partition 21, and thence via plenum space 20 to pipe 5.

Perforate wall 60 comprises a series of electrically conducting members 13, in electrical communication via electrically conducting walls 12 and 14 and 3 and electrically conducting bottom 29 to electric ground 110. A member 13 typically has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered as being formed between respective inner edge joints 42 of adjacent members 13. The members 13 are mounted in a manner such that they cooperate to support gas entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the gas entry portions 61 are transversely disposed, upwardly spaced, and separated by the interposed supporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal. This angle is less than the angle of the failure plane, as determined from soil mechanics tests, for most granular materials that might preferably be employed in the electrostatic panel bed filter, and the specified angle ensures that particulate matter filtered by gas entry faces in the upper part of the panel bed filter and penetrating a short distance into the body of the filter bed will not be dragged downward within the bed by the downward movement of material in the bed to make good losses of material from the lower part of the bed when puffback cleaning is practiced.

Gas exit portions of bed 18 are seen generally at 62 in FIG. 1, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

In operation of electrostatic panel bed filter 1, the panel bed 1 is initially charged with electrically conducting granular material from lines 16 filling spaces 19, 18, and 17 as shown in FIG. 1. Panel bed 1 is connected to a process 71 producing a dusty gas via gas-entry pipe 4, as shown in FIG. 4. For example, process 71 might be combustion of pulverized coal, in which case the dust to be filtered from the gas would be fly ash. Wire 109, entering panel bed 1 via high electrical tension inlet bushing 108 and kept tautly hanging at substantially the center of compartment 11 by weight 111, is connected to a source of high negative electric tension 112, seen in FIG. 4. In general, wire 109 should be at between about 40,000 and 100,000 volts negative in respect to ground 110, and more usually, wire 109 should be at between about 50,000 and 80,000 volts negative. It is best to adjust the tension of wire 109 to as high a negative value as possible without causing undue amounts of sparking between the wire and wall 60 because of electric breakdown of the gas therebetween. It is sometimes advantageous to tolerate a relatively small number of sparks per unit time and to regulate the negative tension of wire 109 to maintain this rate of sparking in order to ensure that the tension is as high as practicable. The negative tension of wire 108 is signified in FIG. 1 by the negative sign (−) in a circle connected to wire 109 in the drawing, and by the positive sign (+) in a circle connected to ground 110.

The gas to be filtered is caused to flow forwardly through electrostatic panel bed filter 1 by opening valve 6 in pipe 5. If process 71 does not supply gas at sufficient pressure to cause the gas to flow readily through panel bed 1, optional blower 72 is conveniently provided to carry gas from pipe 5 to line 73 for conducting clean gas from the system. Periodically, tank 32 is filled with gas at pressure from supply 36, valve 35 is closed, valve 6 is closed to interrupt the flow of gas being filtered, and valve 31 is opened quickly to produce the specified transient reverse flow from compartment 23 to compartment 11. Pipe 15 is provided to withdraw filter cake and granular filter medium spilled from surfaces 39. As seen in FIG. 4, pipe 15 advantageously conducts the spilled solids to means 77 for separating dust and granular medium, for example, by screening or elutriating the dust away from the granular medium. Pipe 78 is provided for withdrawal of dust from means 77, and pipe 76, for return of granular medium to supply hopper 75, from which the medium may be returned to panel bed 1 via valve 74 leading to the several pipes 16. After a few seconds for dust to settle to the bottom of compartment 11, valve 31 is closed, and valve 6 is opened to resume filtration by the freshly cleaned bed 18. It is sometimes advantageous to turn off the high electric tension from wire 109 during the puffback cleaning accomplished by closing valve 6 and opening valve 31.

Transducers 37 and 38 are conveniently provided in a test to determine the aforementioned first and second critical minimum pressure differences between space 23 and space 11, although competent fluid dynamicists will be able to calculate instantaneous pressure difference versus time in a test of puffback, given the porosity of bed 18, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in the aforementioned co-pending application number 1, "Treating Gas and Granular Material in Panel Bed", together with representative data, and this discussion is incorporated herein by reference. In brief, a time interval of about 150 milliseconds represents an approximate upper limit for acceptable performance, beyond which spills from individual gas entry surfaces 39 are badly distributed, there being far more spill from surfaces near the top of a panel like that seen in FIG. 1 than from surfaces near the bottom, and beyond which spills also partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 63. It should be noted, however, that one might, for example, achieve an extremely short time interval by mounting a large number of blank cartridges on wall 3 and by firing them simultaneously to discharge gas explosively into space 23; or one might provide a mechanical diaphragm-displacement means for almost instantaneously reducing the volume of space 23.

Immediately after a puffback cleaning, the granular material of bed 18 moves downward to make good losses of material from the body movement of material into the gas entry portions of the bed and spilled from the gas entry faces 39.

Figure 6:
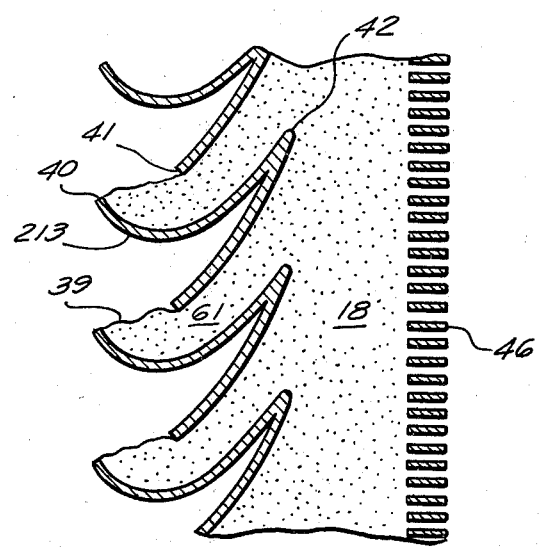
Figure 7:
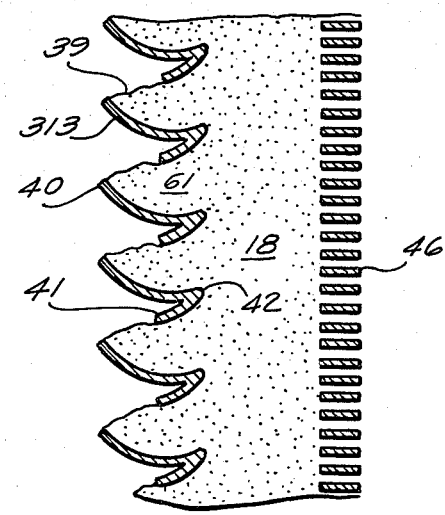

FIGS. 5, 6, and 7 illustrate additional designs 113, 213, and 313 respectively for the support members of perforate wall 60 that may sometimes be preferred. The surface between edge 40 and edge 42 in both FIGS. 5 and 6 is gently curved and inclines downwardly and inwardly from its outer edge and then upwardly and inwardly toward its inner edge. In FIG. 5 the members 113 are mounted to cooperate to support gas entry portions 61, viz., a line drawn through edge 40 of a given member 113 at an angle of about 25° from the horizontal and upwardly toward the next superjacent member 113 should intersect the superjacent member, so that gas entry surface 39 borne by the given member 113 will display an inner edge 141 in contact with the superjacent member. In FIG. 6 support member 213 has an upper and a lower surface articulated at an edge joint at their inner edges 42. The outer edge of a typical gas entry face 39 is substantially contiguous with the outer edge 40 of the upper surface of the typcial member supporting the gas entry face. The inner edge of the typical gas entry face 39 is substantially contiguous with the outer edge 41 of the lower surface of the superjacent member. Designs of the general type illustrated by FIGS. 5 and 6 are advantageous where countercurrent contacting of the gas to be filtered by the electrostatic panel bed filter would also be desirable, as, for example, in the adsorption of an odor by an electrically conducting active carbon in granular form.

In operation of panel bed 1, it is preferable that valve 6 be opened slowly at the start of each gas-filtration cycle, so that a sudden rush of gas into the bed 18 from compartment 11 via surfaces 39 does not compact the bed and cause gaps to appear beneath the surfaces of members 13 extending from edges 41 to edge joints 42.

It should be noted that the porosity of granular material bed 18 should be brought initially to the uniform porosity appropriate for the puffback intensity selected for operation, as discussed more fully in my aforementioned application number 1, "Treating Gas and Granular Material in Panel Bed". Specifically, it is advantageous to subject the panel bed initially to a puffback at an intensity exceeding that contemplated for subsequent operation, or to discharge a controlled quantity of granular material from the bottom of the panel bed.

It will be understood that when granular material is charged to a panel bed of a design like FIG. 5 or 6, it may sometimes be necessary to apply several puffbacks to advance gas entry surfaces to positions 39 contiguous with outer edges 40.

Other designs for perforate wall 63 can serve, and a preferred arrangement is disclosed in my aforementioned co-pending application number 4. It may sometimes be preferred to use a wire-mesh screen for wall 63, as illustrated in FIG. 1 of my aforementioned co-pending application number 1, and sometimes a cloth may be mounted, such as canvas or felt or a fabric woven of fiberglass or graphite fibers or other suitable fibers, between perforate wall 63 and bed 18.

The foregoing descriptions have been directed to a single electrostatic panel bed to facilitate understanding my invention. In an actual installation treating a large throughput of gas, it might be desirable to have a number of panels. A multiplicity of hexagonal structures like bed 18 of FIG. 1 nest nicely to provide a single gas outlet compartment comprising the space outside of the hexagons together with a number of individual gas inlet compartments for each hexagon and within each hexagon.

Straight-walled beds may also serve, like the panel bed 1 of FIG. 1 of my aforementioned co-pending application number 1, and with such beds, preferably working in pairs with the paired gas-inlet walls 60 facing one another, the electrode element providing a corona discharge in the gas inlet compartment should be elongated in its horizontal dimension as well as in its vertical dimension.

I do not wish my invention to be limited to the particular embodiments illustrated in the drawings and described above in detail. Other arrangements will be recognized by study of my aforementioned co-pending applications and by those skilled in the art, as well as purposes other than those discussed herein which the invention can advantageously serve.

I claim:

1. The method of treating a gas involving the separation and removal of particulate material by means of a filter of granular material which comprises:

a. arranging an electrically conducting granular material in a panel bed having a plurality of transversely disposed upwardly spaced gas entry portions separated by interposed electrically conducting grounded supporting members having outer and inner edges with respect to the bed wherein said gas entry portions have gas entry faces substantially contiguous with said outer edges and wherein said bed has gas exit portions spaced from said inner edges;

b. producing a corona discharge of electricity outside of said panel bed and in proximity to said gas entry portions;

c. forwardly flowing gas to be treated in a substantially continuing flow during its treatment in proximity to said corona discharge of electricity to charge electrically the particulate material in the gas and thereby to create a force of attraction between said particulate material and said granular material, and forwardly flowing the gas through said gas entry portions of the granular material bed and outwardly from the gas exit portions to separate anad accumulate particulate material at said gas entry faces;

d. stopping the flow of said gas;

e. causing a transient flow of gas to move in the direction in reverse to the flow of said gas in (c);

f. said transient reverse flow producing first a rise at a given rate of rise and subsequently a fall in the pressure difference between said gas exit portions and said gas entry portions, said difference produced by said transient reverse flow remaining greater than a first critical minimum difference for a time interval less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed.

2. The method of claim 1 in which said time interval is less than about 50 milliseconds.

3. The method of claim 1 in which said particulate material is fly ash from the combustion of pulverized coal and wherein said gas comprises combustion products from said combustion and wherein said corona discharge of electricity is negative in respect to the ground.

4. The method of claim 1 wherein said corona discharge of electricity is interrupted for the duration of said reverse transient flow of gas.

5. The method of treating a gas containing both particulate matter and an odor in which said electrically conducting granular material of claim 1 is an active carbon adsorptive in respect to said odor.

6. The method of claim 5 in which said corona discharge of electricity is positive in respect to the ground.

7. The method of treating a gas involving the separation and removal of particulate material by means of a filter of granular material which comprises:

a. arranging an electrically conducting granular material in a panel bed having a plurality of transversely disposed upwardly spaced gas entry portions separated by interposed electrically conducting grounded supporting members, a typical said member having an upper and a lower surface each having outer and inner edges with respect to the filter bed wherein said surfaces are articulated at an edge joint at their respective inner edges and wherein said gas entry portions have gas entry faces substantially contigous with said outer edges of said upper surfaces and wherein a line drawn through a said outer edge of a said lower surface and also through said inner edge joint to the next subjacent member forms an angle less than about 60° from the horizontal and wherein said filter bed has gas exit portions spaced from said inner edge joints;

b. producing a corona discharge of negative electricity outside of said panel bed and in proximity to said gas entry portions;

c. forwardly flowing gas to be treated in a substantially continuing flow during its treatment in proximity to said corona discharge of negative electricity to charge electrically the particulate material in the gas and thereby to create a force of attraction between said particulate material and said granular material, and forwardly flowing the gas through said gas entry portions of the granular material bed and outwardly from the gas exit portions to separate and accumulate particulate material at said gas entry faces;

d. stopping the flow of said gas;

e. causing a transient flow of gas to move in the direction in reverse to the flow of said gas in (c);

f. said transient reverse flow producing first a rise at a given rate of rise and subsequently a fall in the pressure difference between said gas exit portions and said gas entry portions, said difference remaining greater than a first critical minimum difference for a time interval less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material and accumulated particulate material from the bed; and, g. supplying fresh granular material to said bed to replace material spilled from said gas entry portions.

8. The method of claim 7 in which said time interval is less than about 50 milliseconds.

9. The method of treating a gas involving the separation and removal of particulate material and also involving the removal of an odor by means of a filter-contactor of granular material which comprises:

a. arranging an electrically conducting active carbon in granular form that is adsorptive in respect to said odor in a panel bed having a plurality of transversely disposed upwardly spaced gas entry portions separated by interposed electrically conducting grounded supporting members having outer and inner edges with respect to the bed wherein said gas entry portions have gas entry faces with outer edges substantially contiguous with said outer edges of said supporting members and wherein a typical supporting member is gently curved and inclines downwardly and inwardly from its outer edge and then upwardly and inwardly toward its inner edge and wherein the inner edge of a typical supporting member is either above the inner edge of the gas entry face supported by the member or, when below, a line drawn through these edges is inclined at an angle of less than about 45° to the horizontal and wherein said bed has gas exit portions spaced from said inner edges of said supporting members;

b. producing a corona discharge of electricity outside of said panel bed and in proximity to said gas entry portions;

c. forwardly flowing gas to be treated in a substantially continuing flow during its treatment in proximity to said corona discharge of electricity to charge electrically the particulate material in the gas and thereby to create a force of attraction between said particulate material and said granular carbon, and forwardly flowing the gas through said gas entry portions of the granular carbon bed and outwardly from the gas exit portions to separate and accumulate particulate material at said gas entry faces and to adsorb and remove said odor;

d. stopping the flow of said gas;

e. causing a transient flow of gas to move in the direction in reverse to the flow of said gas in (c);

f. said transient reverse flow producing first a rise at a given rate of rise and subsequently a fall in the pressure difference between said gas exit portions and said gas entry portions, said difference remaining greater than a first critical minimum difference for a time interval less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material and accumulated particulate material from the bed; and g. supplying fresh granular material to said bed to replace material spilled from said gas entry portions.

10. The method of claim 9 in which said time interval is less than about 50 milliseconds.

11. The method of claim 9 in which said gas is odoriferous air containing micron-size particulate material and wherein said corona discharge of electricity is positive in respect to the ground.

12. An electrostatic panel bed gas filter comprising a pair of upwardly extending horizontally spaced-apart electrically conducting perforate retaining walls;

a ground in electrical communication with said perforate walls;

a gas inlet compartment adjacent and in communication with the perforations of the first of the perforate walls;

an elongated electrically conducting electrode element within said gas inlet compartment and substantially coextensive therewith;

a source of high electrical tension biassed with respect to said ground and in electrical communication with said electrode element;

a gas outlet compartment in communication with the perforations of the second of the perforate walls;

closure means about the space between the first and second perforate walls closing said space against the passage of gas except through the perforations of said perforate walls;

feed means for supplying a loose electrically conducting solid particulate material into the space between the perforate walls;

a plurality of support members each adjacent a perforation of said first perforate wall, said support members being arranged to extend outwardly from below their adjacent perforations and into the inlet compartment to support and expose to the inlet compartment a plurality of free surfaces of particulate material, said support members being arranged cooperatively to support the particulate material and retain the material within said space;

an inlet for admitting a gas into the inlet compartment for passage in proximity with said electrode element and into the free surfaces and through the particulate material to the outlet compartment;

an outlet for discharging gas from the outlet compartment;

means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including a. means for moderating the rate of said rise in said pressure difference, b. means for moderating said transient flow so that said pressure difference remains greater than a first critical minimum difference for a time interval less than about 150 milliseconds, said first critical difference being that difference at which a steady flow of gas from said outlet compartment to said inlet compartment just produces a localized spill of particulate material from said free surfaces into said inlet compartment, and c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the particulate material toward said free surfaces to spill a portion of the particulate material from said free surfaces;

and means for discharging from the inlet compartment material which is spilled thereinto by the body-movement means.

13. The electrostatic panel bed gas filter of claim 12 wherein a typical said support member is arranged to extend outwardly and downwardly in a gentle curve from below its adjacent perforation and then to extend further in a gentle curve upwardly and into the inlet compartment and wherein the inner edge of said typical support member is either above the inner edge of the said free surface supported by the member or, when below, a line drawn through these edges is inclined at an angle of less than about 45° to the horizontal.

14. The electrostatic panel bed gas filter of claim 12 wherein said perforate retaining walls are hexagonal when viewed in plan and where said gas inlet compartment is within said first perforate wall and said gas outlet compartment is without said second perforate wall and where said electrode element is a wire hanging vertically at substantially the center of said gas inlet compartment.

15. The electrostatic panel bed gas filter of claim 12 wherein a typical said support member has two surfaces articulated at an edge joint substantially adjacent and below the member's respective perforation and wherein the lower of the two surfaces is arranged to extend outwardly and downwardly from said edge joint and into the inlet compartment and wherein the upper of the two surfaces is arranged to extend outwardly and upwardly from said edge joint and into the inlet compartment and wherein a line drawn through the outer edge of a typical said lower surface and the edge joint of the next subjacent member forms an angle less than about 60° from the horizontal.

16. The electrostatic panel bed gas filter of claim 15 wherein said moderating means (b) moderates said transient flow so that said time interval is less than about 50 milliseconds.

* * * * *